(12) United States Patent
Cedzo et al.

(10) Patent No.: US 7,426,991 B1
(45) Date of Patent: Sep. 23, 2008

(54) ADJUSTABLE VIBRATORY FEEDER

(76) Inventors: Christopher Cedzo, 6411 Naeff Rd., Fairview, PA (US) 16415; David S. Bard, 5761 Platz Rd., Fairview, PA (US) 16415; Gregory Nowak, 7270 Willow Way, Fairview, PA (US) 16415

( * ) Notice: Subject to any disclaimer, the term of this patent is extended or adjusted under 35 U.S.C. 154(b) by 0 days.

(21) Appl. No.: 11/521,273

(22) Filed: Sep. 13, 2006

(51) Int. Cl.
*B65G 27/28* (2006.01)

(52) U.S. Cl. ...................... 198/760; 198/767
(58) Field of Classification Search .............. 198/752.1, 198/758, 759, 760, 763, 767
See application file for complete search history.

(56) References Cited

U.S. PATENT DOCUMENTS

| | | | | | |
|---|---|---|---|---|---|
| 3,087,603 | A | * | 4/1963 | Petrea | 198/763 |
| 4,913,281 | A | * | 4/1990 | Muller | 198/763 |
| 5,664,664 | A | * | 9/1997 | Gaines | 198/769 |
| 6,116,408 | A | * | 9/2000 | Pounds | 198/769 |
| 6,588,581 | B1 | * | 7/2003 | Evansic | 198/760 |
| 6,675,955 | B2 | * | 1/2004 | Nasser-Moghaddassi et al. | 198/769 |
| 6,705,459 | B1 | * | 3/2004 | Musschoot | 198/763 |
| 6,868,960 | B2 | * | 3/2005 | Jones | 198/770 |

* cited by examiner

*Primary Examiner*—Douglas A Hess
(74) *Attorney, Agent, or Firm*—Richard K Thomson

(57) ABSTRACT

The tie bar supporting a feed tray (moving mass) is attached to the reaction mass using one leaf spring and one elastomeric spring. The elastomeric spring comprises first and second elastomeric pads which sandwich a portion of the tie bar to which the feed tray is attached. The elastomeric spring operates in shear with the spring rate of the elastomeric spring being adjusted by increasing/decreasing the compressive force exerted by the first and second elastomeric pads on the tie bar. The adjustable vibratory feeder has demonstrated greatly enhanced stability over other existing systems.

5 Claims, 3 Drawing Sheets

ADJUSTABLE VIBRATORY FEEDER

BACKGROUND AND SUMMARY OF THE INVENTION

The present invention is directed to a vibratory feeder. More particularly, the present invention is directed to a vibratory feeder with improved adjustability. Vibratory feeders using twin sets of leaf springs are known. At least one patent has suggested substituting an elastomeric spring for one of the sets of leaf springs. The problem with the embodiment taught in this patent is that the elastomeric spring acts in compression. Compressed rubber tends to creep, that is, as the force continues to be exerted, over time, the rubber will "submit" to the pressure and move away from the source. Tests on this type of elastomeric spring have shown a wide range of values for the spring rate for the elastomeric spring and, consequently, large variation in the feed rate for the vibratory feeder. When used by a manufacturer who measures quantities using a scale, such variations are totally unacceptable with wide variations in speed and performance. Adjusting the "spring constant" on such a compressive spring requires constant vigilance to maintain the desired flow rate.

The adjustable vibratory feeder of the present invention, available from the assignee as the HS-8 Feeder, addresses these problems by providing a highly stable elastomeric spring. The improved elastomeric spring includes a first elastomeric shear pad extending generally parallel to the primary excitation plane of the moving mass; a second elastomeric shear pad extending generally parallel to the primary excitation plane of the moving mass; a support for the moving mass extending in the primary excitation plane of the moving mass and being sandwiched by the first and second elastomeric shear pads; means to adjust a compressive force exerted by the first and second elastomeric pads on the support for the moving mass to vary a spring rate of the first and second pads and thereby adjust a feed rate of the vibratory feeder system. The elastomer used in the first and second pads is, itself, highly stable. Tests on a feeder employing the elastomeric spring of the present invention showed less than 3% variance over a 40 hour period of operation.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
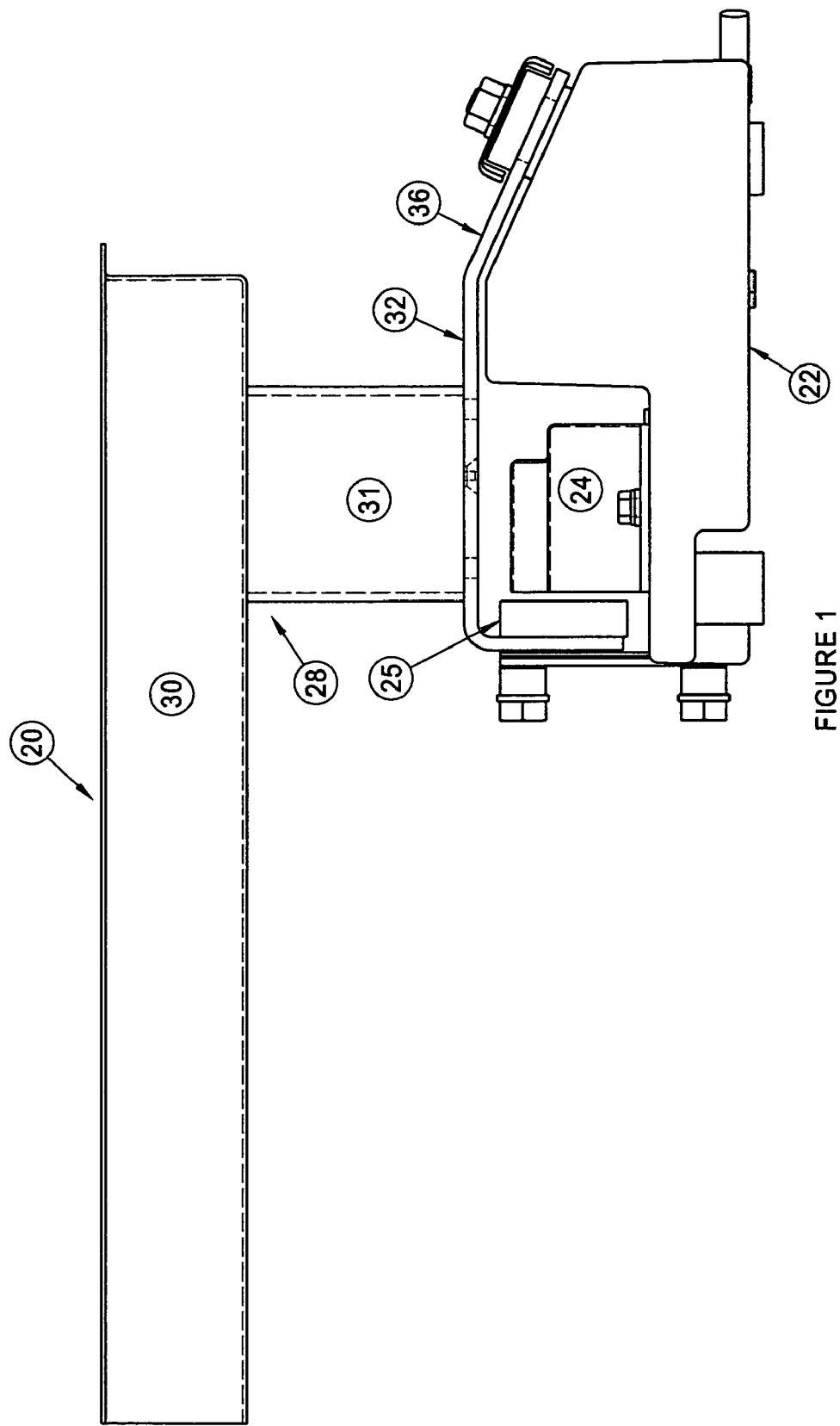
FIG. 1 is a side view of a first embodiment of the vibratory feeder of the present invention.
Figure 2:
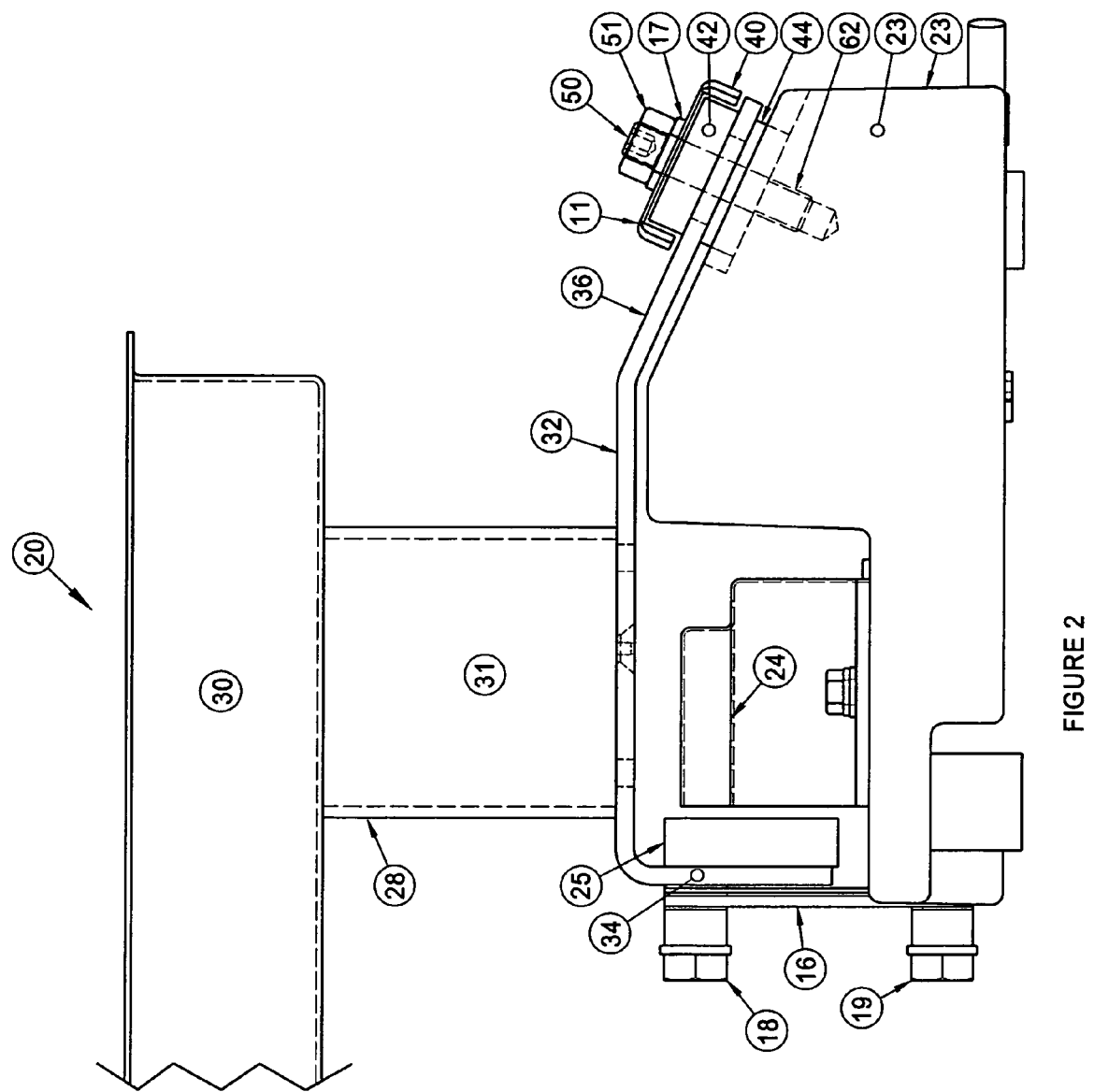
FIG. 2 is an enlarged detailed side view of the first embodiment.
Figure 3:
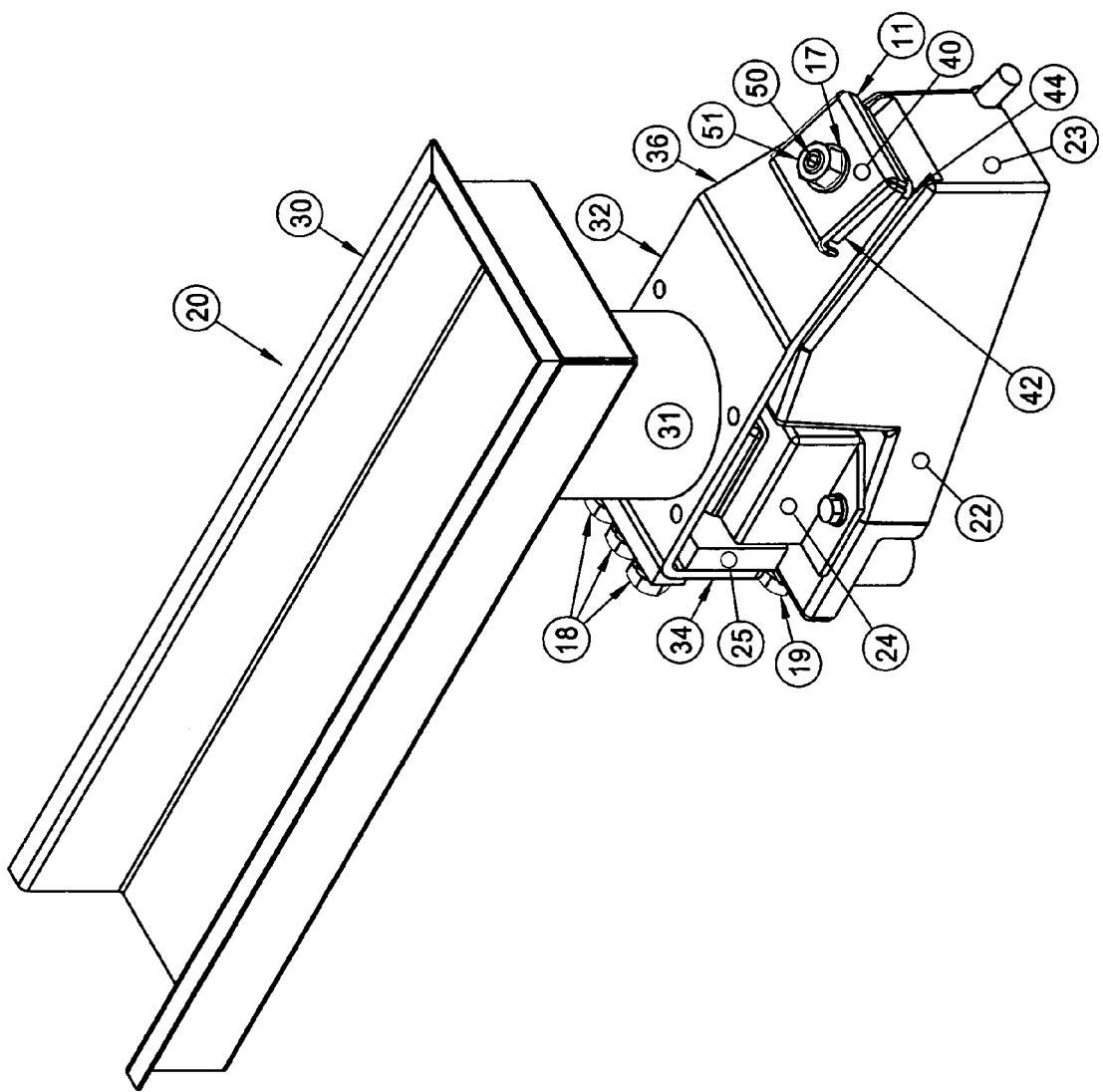
FIG. 3 is a perspective view of the first embodiment.

A first embodiment of the adjustable vibratory feeder system of the present invention is shown in FIGS. 1-3 generally at 20. Adjustable vibratory feeder system 20 includes a reaction mass 22 that includes the vibratory motor 24. Motor 24 alternatively activates a magnetic force which attracts iron plate 25 and then the force is turned off. Moving mass 28 includes vibratory feed tray 30 and tray tower 31 which is mounted to reaction mass 22 by tie bar 32. A front downwardly extending flange 34 of tie bar 32 forms a first connection surface and is secured to reaction mass 22 by one or more leaf springs 16 by bolts 18. The base of leaf spring 16 is secured to reaction mass 22 by bolts 19. The primary excitation plane of the moving mass 28 is generally horizontal. A second connection surface for tie bar 32 is formed by flange 36 which is slightly angled (circa 20°) relative to the primary excitation plane. Flange 36 is secured to the rear portion 23 of reaction mass 22.

Slightly angled flange 36 is sandwiched between a first upper elastomeric pad 42 and second lower elastomeric pad 44 which, together, form rear elastomeric spring 40. Threaded stud 50 extends through first elastomeric pad 42, flange 36, second elastomeric pad 44 and is threadingly received in an aperture 62 in rear portion 23 of reaction mass 22. First elastomeric pad 42 and second elastomeric pad 44 are positioned at first and second angles to the primary excitation plane, the first and second angles being equal to the slight angle of flange 36. Lock washer 17, force distribution plate 11, and compression nut 51 complete the assembly for rear elastomeric spring 40.

In operation, the elastomeric spring 40 operates primarily in shear, not compression. The elastomeric spring rate (and hence, the vibrational amplitude and vibratory feed rate) is adjusted by increasing/decreasing the compressive force exerted by compression nut 51. Table I shows an exemplary test of the adjustable vibratory feeder 20 of the present invention in which elastomeric spring 40 was comprised of first and second U-shaped sections (to facilitate insertion into the system) made of an elastomeric formulation proprietary to Lord Corporation, Erie, Pa. It is anticipated that the commercial pads will be rectangular and have a through hole for the threaded stud 50. The U-shaped sections merely facilitated their addition to an existing feeder. The elastomer is highly stable, a characteristic valuable to the operation of the feeder 20.

For the purposes of this test, the deflection of tray tower 31 was maintained constant at 0.090 inch, to ascertain the contribution of the elastomeric spring to the overall total spring rate of the system. The input frequency (tune point) was varied to provide the maximum acceleration (mVAC) at each setting. In other words, the system was operated at the harmonic frequency for each adjustment point. The total spring rate was then calculated from the values measured at each setting and the fixed value of the leaf springs subtracted to provide the spring rate for the elastomeric spring. The graph portion of Table I depicts the spring rate for the elastomeric spring as a function of its compression.

Table II demonstrates the stability of the system. Adjustable vibratory feeder 20 as configured for the Table I tests, was run continuously for a period of approximately 40 hours. The results tabulated in Table III indicate a variation of only 0.003 inch over the period with no change shown in the last 16 hours. In other words, the system showed only 2.5% variation during the 40 hour run. This is the type of stability needed for commercial operations.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A vibratory feeder system comprising a) a reaction mass including a vibratory motor;

b) a moving mass including a feed tray having a delivery end extending toward a forward end of said vibratory feeder system;

c) a generally L-shaped tie bar positioned between said reaction mass and said moving mass;

d) leaf spring means interconnecting a downwardly-extending, forward portion of tie bar to said reaction mass;

e) elastomeric spring means interconnecting a generally horizontally-extending, rear portion of said tie bar to said reaction mass, said elastomeric spring means including a first elastomeric pad and a second elastomeric pad which sandwich said rear portion of said tie bar of said feed tray, said first and second elastomeric pads operating in shear;

f) means to adjust a compressive force exerted by said first and second elastomeric pads on said portion of said tie bar of said feed tray to vary a shear spring rate of said first and second pads and thereby adjust a feed rate of said vibratory feeder system.

2. The vibratory feeder system of claim 1 wherein said means to adjust comprises a threaded stud extending through said first and second elastomeric pads and said portion of said tie bar of said feed tray and having a compression nut threaded thereon.

3. In a vibratory feeder system including a reaction mass, a moving mass which has a primary excitation plane, the moving mass including a feed tray with a forward delivery end, and leaf spring means interconnecting a front portion of the moving mass to the reaction mass, the improvement comprising:

a) a first elastomeric shear pad having a shear plane extending at a first acute angle to the primary excitation plane of the moving mass;

b) a second elastomeric shear pad having a shear plane extending at a second acute angle to the primary excitation plane of the moving mass;

c) a generally L-shaped tie bar attached to the moving mass having a portion extending at a third acute angle to the primary excitation plane of the moving mass, said portion being sandwiched by said first and second elastomeric shear pads;

d) means to adjust a compressive force exerted by said first and second elastomeric pads on said portion of said tie bar on said moving mass to vary a shear spring rate of said first and second pads and thereby adjust a feed rate of the vibratory feeder system.

4. The improvement of claim 3 wherein said first, second and third acute angles are equal.

5. The improvement of claim 4 wherein said first, second and third acute angles equal 20°.

* * * * *